US008352758B2

(12) United States Patent
Atkins et al.

(10) Patent No.: US 8,352,758 B2
(45) Date of Patent: Jan. 8, 2013

(54) POWER BUS CURRENT BOUNDING USING LOCAL CURRENT-LIMITING SOFT-SWITCHES AND DEVICE REQUIREMENTS INFORMATION

(75) Inventors: Robert G. Atkins, Poughkeepsie, NY (US); Edward N Cohen, Highland, NY (US); Philip M Corcoran, Highland, NY (US); Edward J Seminaro, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 12/728,675

(22) Filed: Mar. 22, 2010

(65) Prior Publication Data

US 2011/0231676 A1 Sep. 22, 2011

(51) Int. Cl.
*G06F 1/00* (2006.01)
*G06F 1/26* (2006.01)
*G06F 11/30* (2006.01)

(52) U.S. Cl. ........ 713/300; 713/320; 713/323; 713/324; 713/340

(58) Field of Classification Search .................. 713/300, 713/320, 323, 324, 340
See application file for complete search history.

(56) References Cited

U.S. PATENT DOCUMENTS

| | | | |
|---|---|---|---|
| 4,135,234 A | 1/1979 | Forge | |
| 4,229,665 A | 10/1980 | Tiedt | |
| 5,148,546 A | 9/1992 | Blodgett | |
| 5,404,543 A | 4/1995 | Faucher et al. | |
| 5,623,647 A | 4/1997 | Maitra et al. | |
| 5,637,933 A | 6/1997 | Rawlings et al. | |
| 5,726,901 A | 3/1998 | Brown | |
| 6,002,878 A | 12/1999 | Gehman et al. | |
| 6,219,795 B1 * | 4/2001 | Klein | 713/300 |
| 6,330,639 B1 | 12/2001 | Fanning et al. | |
| 6,404,077 B1 | 6/2002 | Moran | |
| 6,442,700 B1 | 8/2002 | Cooper | |
| 6,512,652 B1 | 1/2003 | Nelson et al. | |
| 6,553,502 B1 | 4/2003 | Hurd et al. | |
| 6,625,736 B1 * | 9/2003 | Berthaud et al. | 713/300 |
| 6,657,634 B1 | 12/2003 | Sinclair et al. | |
| 6,775,787 B2 | 8/2004 | Greene | |

(Continued)

OTHER PUBLICATIONS

Wu, et al., "Cycle-Accurate Macro-Models for RT-Level Power Analysis", IEEE Transactions on Very Large Scale Integration (VLSI) systems, vol. 6, No. 4, Dec. 1998, pp. 520-528.

*Primary Examiner* — Vincent Tran
(74) *Attorney, Agent, or Firm* — Mitch Harris, Atty at Law, LLC; Andrew M. Harris; Matthew W. Baca

(57) ABSTRACT

An energy management control method and controller reduce power supply current and/or subsystem cooling overhead that reduces system efficiency, may reduce system reliability and may increase ambient noise. Multiple device connectors are supplied from corresponding soft switches that are programmed to provide a current level that is sufficient to supply the maximum current for the device installed in the corresponding device connector. The current level may be determined from device information provided from the device during initialization, which may directly specify a maximum current requirement. Alternatively, the maximum current requirement can be determined from other device-identifying information such as a unique device identifier. As a result a guaranteed maximum current or power and power dissipation can be determined, and multiple power supplies and/or cooling devices such as air movement devices (AMDs) may be enabled, disabled or otherwise controlled accordingly.

21 Claims, 5 Drawing Sheets

U.S. PATENT DOCUMENTS

| | | |
|---|---|---|
| 6,820,222 B2 | 11/2004 | Swoboda |
| 6,841,898 B2 | 1/2005 | Moran |
| 6,904,534 B2 | 6/2005 | Koenen |
| 6,989,657 B2 | 1/2006 | Kirn |
| 6,996,441 B1 | 2/2006 | Tobias |
| 7,058,480 B1 * | 6/2006 | Kawanishi et al. ............ 700/286 |
| 7,111,177 B1 | 9/2006 | Chauvel et al. |
| 7,127,542 B2 | 10/2006 | Parameswaran |
| 7,155,623 B2 | 12/2006 | Lefurgy et al. |
| 7,272,517 B1 | 9/2007 | Brey et al. |
| 7,281,146 B2 | 10/2007 | Nalwadi et al. |
| 7,356,718 B2 | 4/2008 | Menke et al. |
| 7,567,579 B2 * | 7/2009 | Korcharz et al. ............ 370/401 |
| 7,607,030 B2 | 10/2009 | Goodrum et al. |
| 7,627,005 B2 | 12/2009 | Peeke |
| 7,643,307 B2 | 1/2010 | Bosco et al. |
| 2002/0066045 A1 * | 5/2002 | Layton et al. ................. 713/300 |
| 2003/0080624 A1 * | 5/2003 | Belson et al. ................... 307/85 |
| 2003/0210247 A1 | 11/2003 | Cui et al. |
| 2004/0003305 A1 * | 1/2004 | Tokunaga ..................... 713/300 |
| 2004/0039892 A1 | 2/2004 | Goldschmidt |
| 2004/0044914 A1 | 3/2004 | Gedeon |
| 2004/0083478 A1 | 4/2004 | Chen et al. |
| 2005/0049729 A1 | 3/2005 | Culbert et al. |
| 2005/0067902 A1 * | 3/2005 | Bemat et al. ................... 307/140 |
| 2005/0125701 A1 | 6/2005 | Van Hensbergen et al. |
| 2005/0125702 A1 | 6/2005 | Keller et al. |
| 2005/0138442 A1 | 6/2005 | Keller, Jr. et al. |
| 2005/0160151 A1 | 7/2005 | Rawson, III et al. |
| 2005/0268189 A1 | 12/2005 | Soltis, Jr. |
| 2006/0129856 A1 | 6/2006 | Main et al. |
| 2006/0164773 A1 * | 7/2006 | Stanford et al. ............. 361/93.1 |
| 2006/0230299 A1 | 10/2006 | Zaretsky et al. |
| 2006/0271804 A1 | 11/2006 | Alperin et al. |
| 2007/0049133 A1 | 3/2007 | Conroy et al. |
| 2008/0052437 A1 | 2/2008 | Loffink et al. |
| 2008/0072090 A1 * | 3/2008 | O'Connor et al. ............. 713/330 |
| 2008/0114948 A1 | 5/2008 | Le et al. |
| 2008/0201589 A1 * | 8/2008 | Turner et al. ................... 713/321 |
| 2009/0103221 A1 * | 4/2009 | Aronson et al. ............. 361/93.2 |
| 2010/0106983 A1 * | 4/2010 | Kasprzak et al. ............. 713/300 |

* cited by examiner

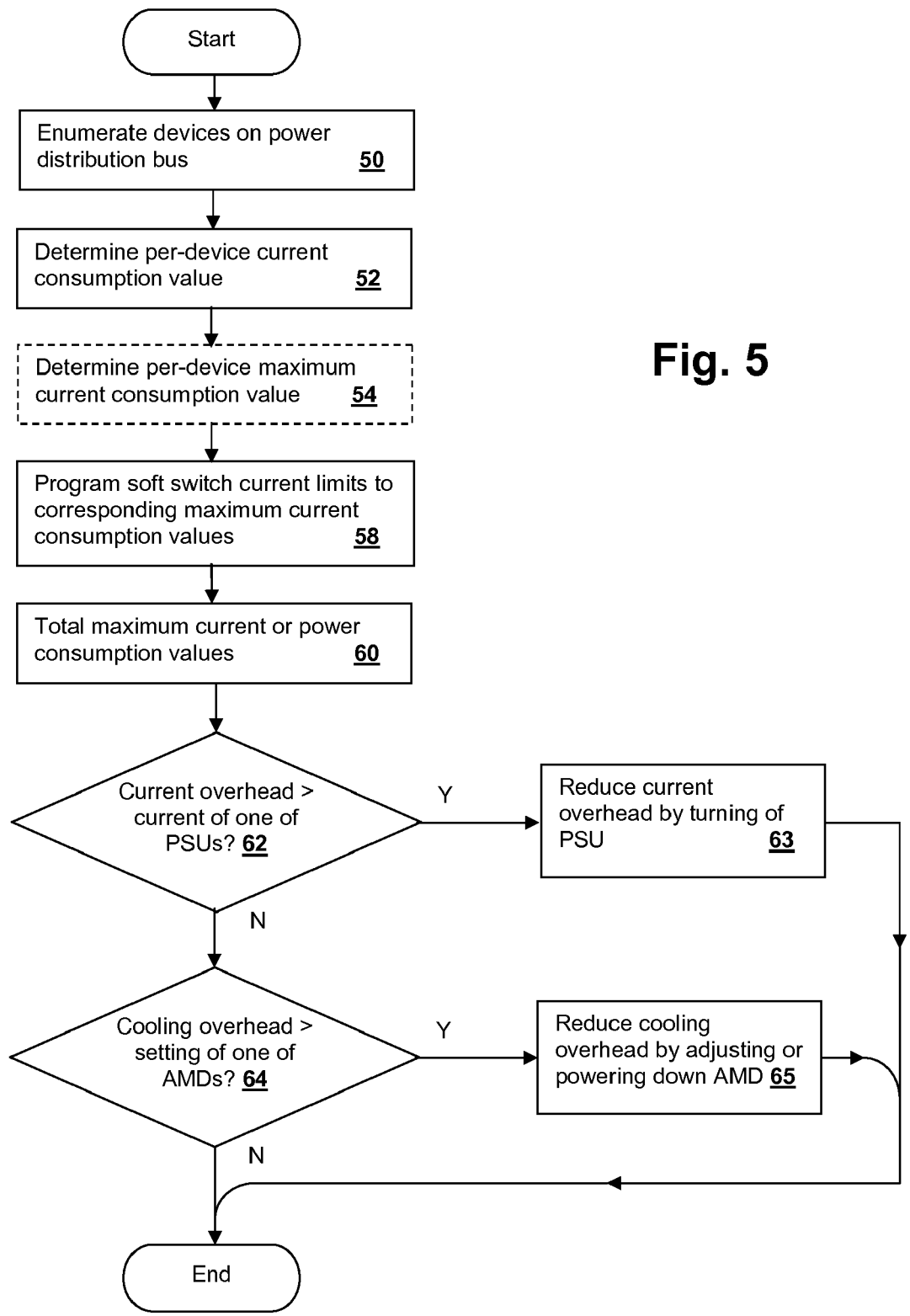

POWER BUS CURRENT BOUNDING USING LOCAL CURRENT-LIMITING SOFT-SWITCHES AND DEVICE REQUIREMENTS INFORMATION

BACKGROUND OF THE INVENTION

1. Field of the Invention

The present invention is related to computer systems in which power is supplied to multiple devices from one or more common power supplies, and more specifically to energy management techniques that permit reduction of overhead in the power supply by locally limiting power supply current provided to the devices using soft switches.

2. Description of Related Art

In computer peripheral subsystems, and in other subsystems such as storage subsystems, in which devices may be added or removed to I/O connections, power is also distributed using the I/O connectors or using additional power bus connectors. Examples of such connections are as card rack connectors, e.g. peripheral component interconnect (PCI) or PCI extended (PCI-X) bus connectors or PCI-Express (PCI-e) connectors. Power is also distributed in systems using external cabled connectors such as IEEE-1994 interfaces or universal serial bus (USB) interfaces.

In subsystems in which an unknown or potentially variable group of devices may be attached to such power connections, the potential current that is maintained in availability to the power distribution system is necessarily higher than that actually used by the totality of the devices. In general, there is a significant amount of overhead, because either the maximum current that may be required by a group of devices is set at a multiple of the per-device maximum power specification for the particular I/O interface or associated power connection by the number of connections available, or by the number of devices actually present. In many such systems, multiple power supplies are used to provide current to the power distribution system and if only a relative few devices are installed, or the installed devices are mostly low-power devices, a power supply may be needlessly operating, reducing system efficiency and potentially lowering reliability. Finally, in installations such as server and storage racks, multiple air moving devices (AMDs) may be operated to handle the maximum possible generated heat, and in the above low power usage examples, operation of all of the AMDs may be unneeded, with the resultant cooling overhead also reducing system energy efficiency and additionally raising ambient noise levels.

Therefore, it would be desirable to provide a energy management method and energy management system that reduces the current and or cooling overhead in a power distribution system.

BRIEF SUMMARY OF THE INVENTION

The invention is embodied in a energy management method, a computer program product and a energy management subsystem that manages current limits of multiple power supply connections on a power distribution bus in accordance with determined device maximum current requirements.

The method determines the maximum current requirement for multiple devices in the subsystem, then programs current limits of the multiple supply connections in accordance with the determined maximum current requirement. The method also totals the current limits to determine a total maximum current and then controls one or both of the power supplies providing current to the power distribution bus or cooling devices to reduce one or both of the available current overhead or a cooling overhead.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 5 is a flow chart of a method as performed in an energy management subsystem in accordance with an embodiment of the present invention.

DETAILED DESCRIPTION OF THE INVENTION

The present invention encompasses energy management systems in computer systems. In particular, the present invention encompasses techniques that limit the individual power supply currents available to multiple detachable devices, so that the power supply and/or cooling system overhead can be dynamically adapted to particular system configurations to improve system efficiency by reducing a number of active power supplies or cooling devices such as air movement devices (AMDs), e.g., chassis air circulation fans. For example, when multiple power supplies are used to supply power to a chassis power distribution system, the power supplies are generally sized to handle the total current required by the maximum power consumption value associated with each of the device connectors, such as peripheral component interconnect (PCI) slots or other interface connector type. However, if, for example, only a fraction of the device connectors are populated with devices, or the mix of installed devices have relatively low power requirements, then all of the multiple power supplies may not be needed, and can be disabled, improving the efficiency of the power supply system, since power supplies are generally more efficient when supplying output current levels near their maximum capacity than at lower output current levels. Further, heat removal requirements, generally met by cooling devices such as AMDs or active cooling systems such as liquid circulating and electronic chillers.

Figure 1:
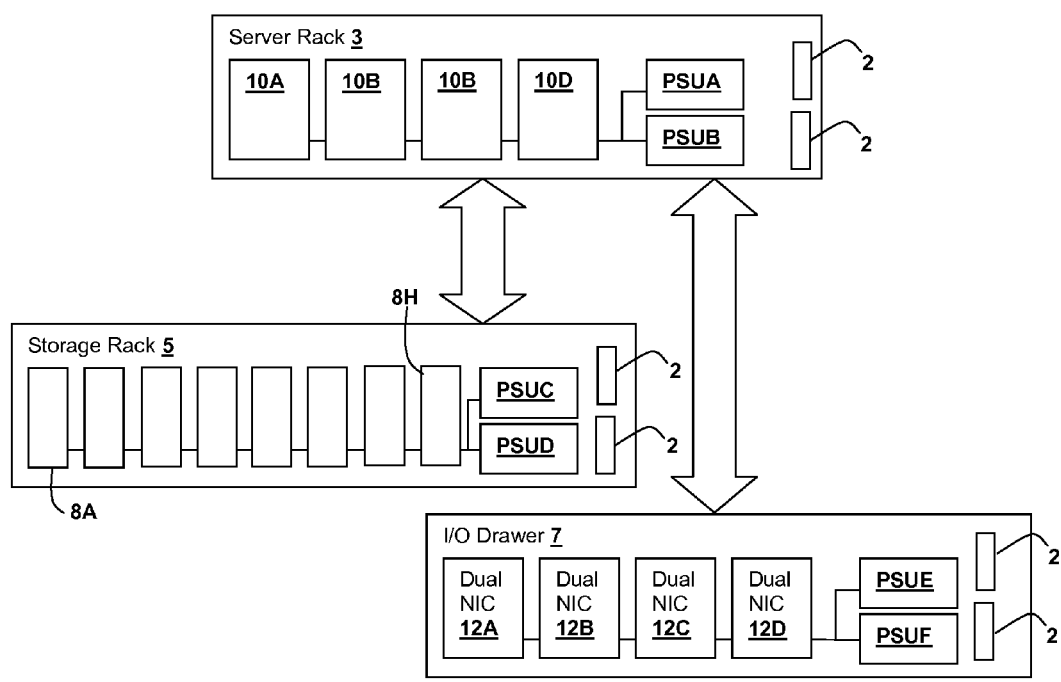
FIG. 1 is a block diagram illustrating a computer system including in which techniques according to an embodiment of the present invention are practiced.

Referring now to FIG. 1, a computer system in which energy management techniques in accordance with an embodiment of the present invention are practiced is shown. A server rack 3 includes device PCI slot positions for accepting a number of processing blades 10A-10D. Power for operating blades 10A-10D is provided from two power supply units (PSUs) PSUA and PSUB. A pair of fans 2 provide air movement through server rack 3. Server rack 3 is connected to a storage rack 5 that includes connector positions for accepting a number of storage devices 8A-8H, which may be, for example hard disc drives (HDDs) or solid state drives (SSDs). Storage rack 5 is supplied by PSUs PSUC and PSUD. Another pair of fans 2 are included in storage rack 5 for providing air movement through storage rack 5. Server rack 3 is also connected to I/O drawer 7, for connection of devices such as dual network interface controllers (Dual NICs) 12A-12D. I/O drawer 7 is supplied by PSUs PSUE and PSUF. Another pair of fans 2 are included in I/O drawer 7 for providing air movement through I/O drawer 7. The computer system depicted in FIG. 1 is intended as an example of a computer system in which energy management techniques in accordance with the present invention may be practiced, but is not intended to be limiting, as the techniques of the present invention can be practiced in other computer systems such as workstations, notebook computers and other special-purpose devices, including those that are not general-purpose computers systems, but include the ability to determine and control maximum power supply current levels provided to connectors that supply power to detachable devices. Further, FIG. 1 illustrates a fully-populated system for descriptive purposes, while the techniques of the present invention are particularly advantageous when a computer system such as the one illustrated is underpopulated, or is populated with devices having relatively low power requirements. For example, if storage rack 5 were filled with SSDs, operation of both of PSUs PSUC and PSUD would probably not be required and the techniques of the present invention can improve efficiency and may also reduce noise and further improve efficiency by disabling one or both of fans 2 located in storage rack 5. In another example, I/O drawer 7 might be populated with a single Dual NIC 12A, in which case power requirements would permit disabling PSU PSUF and one or both of fans 2 in I/O drawer 7.

Figure 2:
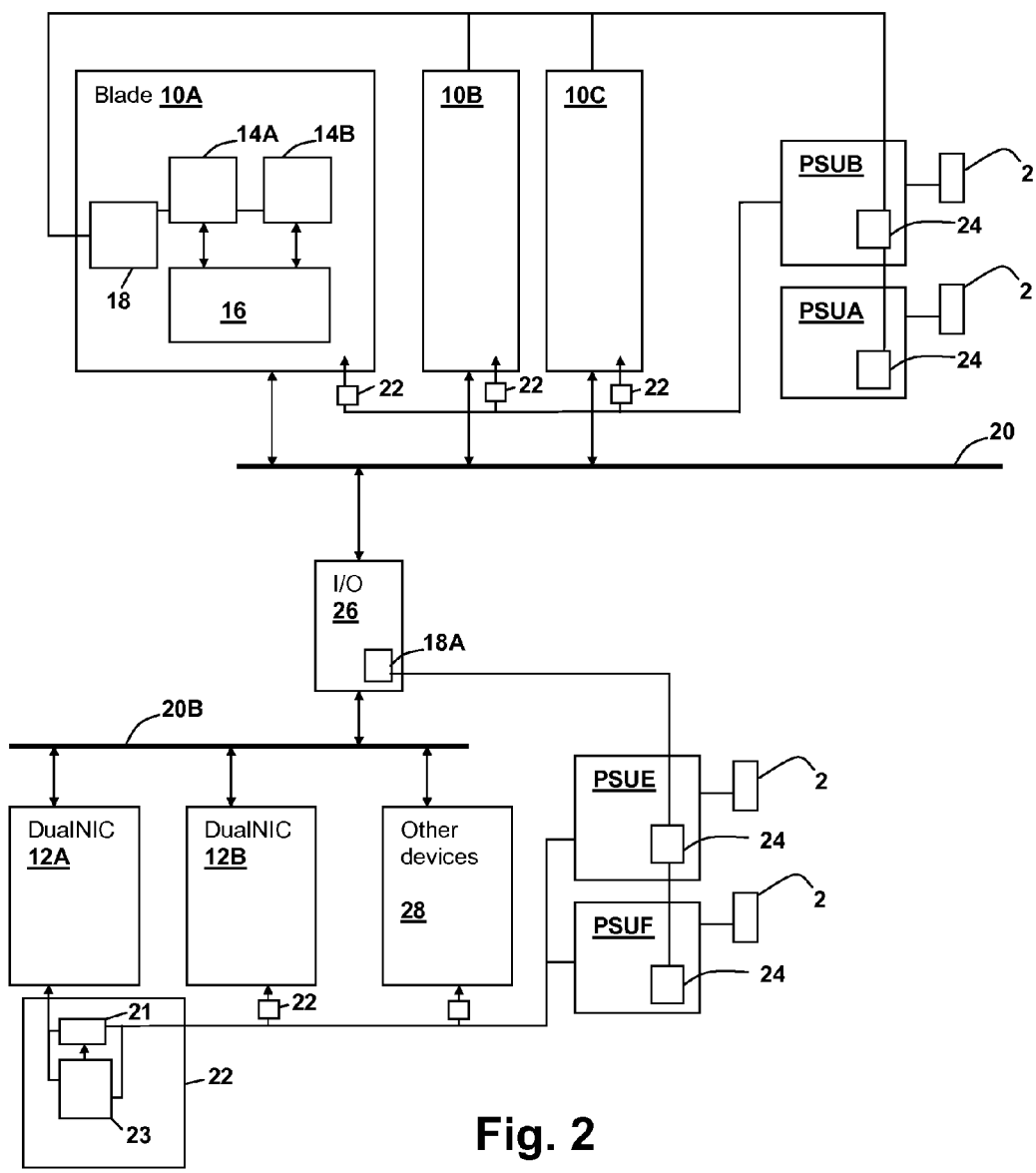
FIG. 2 is a detailed block diagram of a portion of the computer system of FIG. 1.

Referring now to FIG. 2, details of the computer system of FIG. 1 are shown in a detailed electrical block diagram. Blade 10A includes a pair of processors 14A and 14B, both of which generally include multiple cores and on-chip cache memories. A portion of system memory 16 is also provided in blade 10A. Other blades 10B and 10C are generally identical in structure to blade 10A, and blade 10D is depicted as not installed in the configuration depicted in FIG. 2. Each of the power supply connections to which blades 10A-10C are coupled includes a soft switch 22 having a programmable maximum current limit that will disable the corresponding blade 10A-10C if the maximum current limit threshold is exceeded. Since, in the present invention, the maximum current limit threshold is programmed to be equal to or slightly (e.g., 20%) above the maximum current that would ever be required by the particular corresponding installed device (blade), the threshold will only be exceeded if the device is defective, which can aid in limiting damage to server rack 3 and possibly the defective device itself, but reducing the chance of burning components on the defective device. Soft switches 22 can be programmed from an operating system daemon, or a hypervisor, executed by any of processors 14A and 14B within blades 10A-10C, and/or executed by a remote processor coupled to server rack 3. However, each of the illustrated blades 10A-10C also generally includes a service processor 18 that can be used to provide housekeeping tasks such as energy management functions, alone or in concert with a hypervisor. For example, each of service processors 18 may program soft switch 22 at the corresponding connector based on current levels specified by the hypervisor, which can obtain information identifying and/or specifying a maximum current level for blades 10A and any other devices installed in server rack 3. PSUs PSUA and PSUB include controllers 24, which may be service processors or other control logic/processors that provide for enabling and disabling PSUA and PSUB and AMDs such as fans 2 within server rack 3. Soft switches 22 generally include a current sensing/current control element 23, such as one or more pass transistors and a control circuit 21 that slowly ramps up current applied to the corresponding device at startup or after a hot-swap event and compares a current measured through current sensing/current control element 23 to a threshold, which is a programmable threshold for the programmable soft switches 22 used in the depicted embodiments of the present invention. If the current exceeds the programmable threshold, control circuit 21 turns off current sensing/current control element to prevent an over-current condition and possible damage to the corresponding device or the system.

Each of blades 10A-10C is coupled to a local backplane bus 20 such as a PCI bus, which is then coupled to other chassis such as I/O drawer 7 by an I/O unit 26, that couples to another local backplane bus 20B, such as another PCI bus, to which each of the I/O devices installed in I/O drawer 7 connect. In the depicted configuration, two dual NICs 12A and 12B are installed in I/O drawer 7, along with other devices 28, which may be lower power devices. Each of the power supply connections to which dual NICs 12A and 12B and other devices 28 are attached include a soft switch 22 that is programmed to supply a maximum current equal to or slightly greater than a maximum current level provided by or for the corresponding device. Soft switches 22 as above may be programmed from commands received from a hypervisor or other executing within blades 10A-10D, another processor, or a service processor, such as service processor 18A included within I/O unit 26 of I/O drawer 7. Based upon the combined current limits set for soft switches 22 within I/O drawer 7, one of PSUs PSUE or PSUF may be disabled, along with one or both of fans 2, for example, under control of controllers 24. Details of storage rack 5 of FIG. 1 are not shown in FIG. 2 for clarity, but are similar to those shown for server rack 3 and I/O drawer 7.

Figure 3:
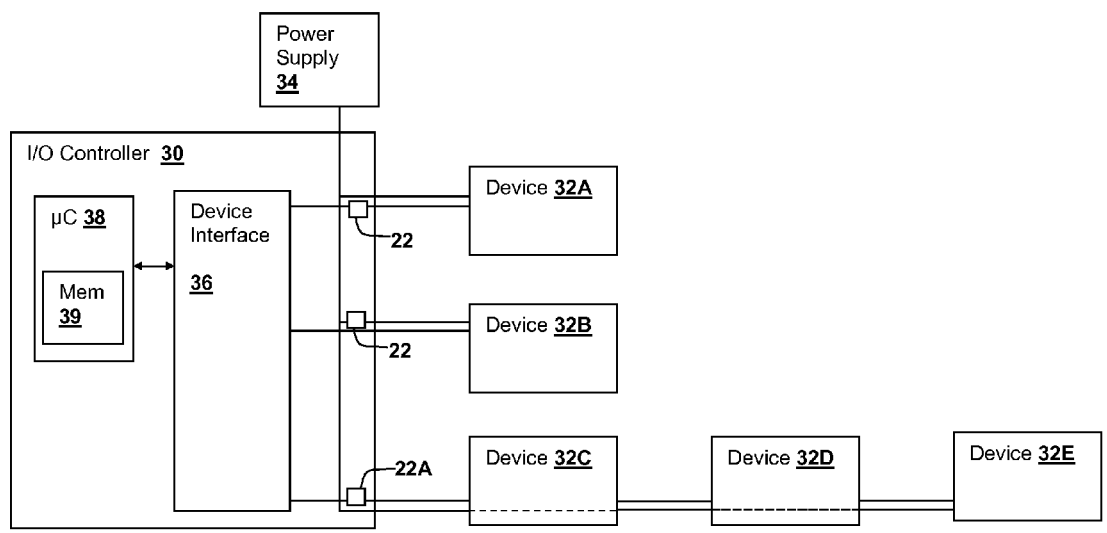
FIG. 3 is a block diagram of a peripheral device energy management scheme in accordance with another embodiment of the present invention.

Referring now to FIG. 3, a peripheral device energy management scheme in accordance with another embodiment of the present invention is shown. In FIG. 3, only a I/O controller 30 and connected devices 32A-32E are shown, which may form part of a notebook computer system, desktop workstation, or another dedicated electronic system with external device interfaces that distribute power to external devices. A power supply provides power to I/O controller 30, which then distributes power to devices 32A-32E. For some applications, it is not necessary to have multiple power supplies having a selectable operation as described above in order to improve efficiency when power requirements are low, as for example when power converters can be operated in a lower overhead mode when lower output power levels can be tolerated. Therefore, power supply 34 may include multiple converters with selectable operation, or may have a selectable mode of operation that improves efficiency at lower output current levels. As in the system depicted in FIG. 1 and FIG. 2, I/O controller 30 includes soft switches 22 and 22A for each connector that supplies power from I/O controller to external devices 32A-32E. However, since devices 32C-32E are connected in a daisy-chain configuration, soft switch 22A is programmed to a maximum current limit threshold that is equal to (or slightly greater than) the total maximum current values for all of devices 32C-32E. For example, in 6-wire IEEE-1394 connections and where USB hubs receive power from a system connector and distribute power, a limit may be set for the system connection that limits the current via soft switch 22A that is substantially less than the maximum power specified for the interface type, e.g., 500 ma for USB. Providing the ability to limit the current actually supplied based upon the expected current requirements for the connected devices ensures that system efficiency can be optimized, while also ensuring that the expected current levels are never actually exceeded by a defective device or a device for which the maximum current level does not match the expected/reported value.

Figure 4:
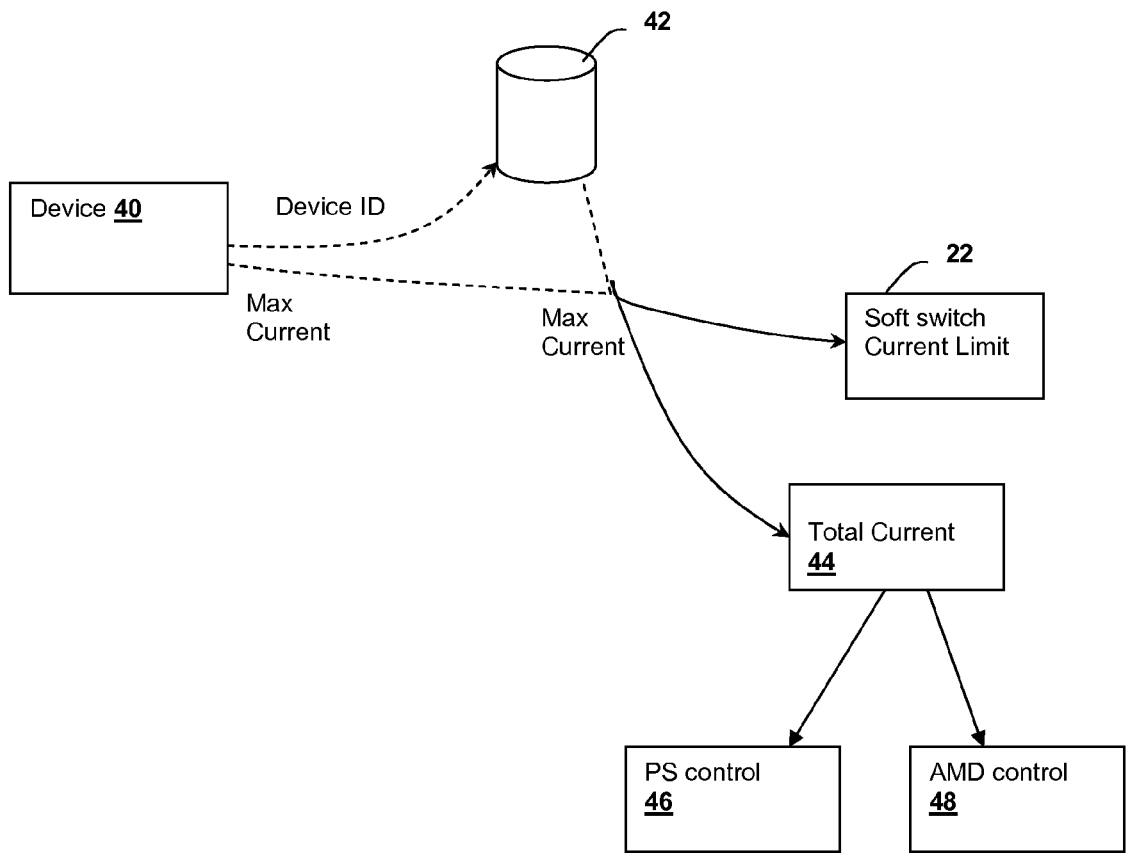
FIG. 4 is a pictorial diagram depicting information flow in a system in accordance with an embodiment of the present invention.

Referring now to FIG. 4, information flow within an energy management system in accordance with an embodiment of the present invention is shown. During initialization of the system, device information is generally collected from bus-connected devices, that in the case of PCI, vital product data (VPD) information can be used to indicate the maximum current Max Current that will be needed by a device 40 under worst-case operating conditions. Maximum current Max Current can then be used to set a corresponding soft switch 22 current limit value and used in accumulation of the total maximum current 44 for all of the connected devices, which can then be used to control the power supply units via power supply control mechanism 46 and/or cooling devices such as AMDs via AMD control mechanism 48. As an alternative, the device identifier Device ID, which generally provides a manufacturer code as well as a product code, could be used to obtain a maximum current level for the device from a database 42 which may be local or remote.

Referring now to FIG. 5, an energy management method, in accordance with an embodiment of the invention, is depicted in a flowchart. First the devices on the power distribution bus are enumerated (step 50), for example, in a PCI bus, enumeration occurs at system boot. A per-device current consumption value is determined (step 52), either from direct information such as a VPD maximum current value, or indirectly, such as retrieval from a database using the device information. A per-device maximum current consumption level may be determined (step 54) if the device information is not the maximum current or if a margin is to be provided above the reported current requirement (e.g., the 120% value mentioned as an example above). The soft switch current limits are set to the corresponding maximum current consumption value for the corresponding devices (step 58) and the maximum current or power consumption values are totaled (step 60). If the current overhead, i.e., the available power supply current minus the total of the maximum current or power consumption values from step 60 is greater than the current available from one of the PSUs (decision 62), then that PSU can be disabled (step 63). Also, if the cooling overhead is greater than the setting of one of the AMDs or other cooling device (decision 64), then the cooling device can be disabled (step 65).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of managing current supplied to a power distribution bus in a subsystem having multiple device connectors for attaching multiple corresponding devices, the method comprising:
   enumerating devices connected to the subsystem to determine individual multiple devices that are connected to the subsystem;
   responsive to determining the individual multiple devices that are connected to the subsystem, determining maximum current consumption values for the individual multiple devices, wherein the maximum current consumption values indicate the maximum current that can be required by the corresponding individual multiple devices;
   programming current limit values that control the current supplied to corresponding ones of the multiple devices in conformity with the corresponding maximum current consumption values;
   adding the maximum current limit values to obtain an indication of a total maximum current or power required by the power distribution bus; and
   adjusting one or both of a power supply current overhead of the power distribution bus or a cooling overhead of the subsystem according to the indication of the total maximum current or power, such that a current supply capability of the power distribution bus meets or exceeds the total maximum current computed by the adding.

2. The method of claim 1, wherein the programming adjusts current limit values of soft switches that couple corresponding ones of the multiple device connectors to the power distribution bus.

3. The method of claim 1, wherein the determining retrieves a device-specified maximum current consumption value obtained from each of the multiple devices during initialization of the devices.

4. The method of claim 3, wherein the multiple device connectors are peripheral component interconnect (PCI) connectors and wherein the device-specified maximum current consumption value is a vital product data value.

5. The method of claim 4, wherein the programming adjusts current limit values of soft switches that couple corresponding ones of the multiple device connectors to the power distribution bus.

6. The method of claim 1, wherein the adjusting comprises:
   determining whether or not the total maximum current or power is less than a threshold value;
   disabling a power supply connected to the power distribution bus in response to determining that the total maximum current or power is less than the threshold value; and
   enabling the power supply in response to determining that the total maximum current or power is not less than the threshold value.

7. The method of claim 1, wherein the adjusting comprises:
   determining whether or not the total maximum current or power is less than a threshold value;
   disabling an air movement device of the subsystem in response to determining that the total maximum current or power is less than the threshold value; and
   enabling the air movement device in response to determining that the total maximum current or power is not less than the threshold value.

8. A computer subsystem including comprising a processor for executing program instructions forming a energy management module stored in a memory coupled to the processor, the energy management module for managing current supplied to a power distribution bus in a subsystem having multiple device connectors for attaching multiple corresponding devices, the program instructions comprising:
   program instructions for enumerating devices connected to the subsystem to determine individual multiple devices that are connected to the subsystem;
   program instructions for, responsive to determining the individual multiple devices that are connected to the subsystem, program instructions for determining maximum current consumption values for the individual multiple devices, wherein the maximum current consumption values indicate the maximum current that can be required by the corresponding individual multiple devices;
   program instructions for programming current limit values that control the current supplied to corresponding ones of the multiple devices in conformity with the corresponding maximum current consumption values;
   program instructions for adding the maximum current limit values to obtain an indication of a total maximum current or power required by the power distribution bus; and
   program instructions for adjusting one or both of a power supply current overhead of the power distribution bus or a cooling overhead of the subsystem according to the indication of the total maximum current or power, such that a current supply capability of the power distribution bus meets or exceeds the total maximum current computed by the adding.

9. The computer subsystem of claim 8, wherein the program instructions for programming adjust current limit values of soft switches that couple corresponding ones of the multiple device connectors to the power distribution bus.

10. The computer subsystem of claim 8, wherein the program instructions for determining retrieve a device-specified maximum current consumption value obtained from each of the multiple devices during initialization of the devices.

11. The computer subsystem of claim 10, wherein the multiple device connectors are peripheral component interconnect (PCI) connectors and wherein the device-specified maximum current consumption value is a vital product data value.

12. The computer subsystem of claim 11, wherein the program instructions for programming adjusts current limit values of soft switches that couple corresponding ones of the multiple device connectors to the power distribution bus.

13. The computer subsystem of claim 8, wherein the program instructions for adjusting comprise program instructions for:
   determining whether or not the total maximum current or power is less than a threshold value;
   disabling a power supply connected to the power distribution bus in response to determining that the total maximum current or power is less than the threshold value; and
   enabling the power supply in response to determining that the total maximum current or power is not less than the threshold value.

14. The computer subsystem of claim 8, wherein the program instructions for adjusting comprise program instructions for:
   determining whether or not the total maximum current or power is less than a threshold value;
   disabling an air movement device of the subsystem in response to determining that the total maximum current or power is less than the threshold value; and
   enabling the air movement device in response to determining that the total maximum current or power is not less than the threshold value.

15. A computer program product comprising a computer readable storage device storing program instructions for execution by a processor, the program instructions forming a energy management module, the power management module for managing current supplied to a power distribution bus in a subsystem having multiple device connectors for attaching multiple corresponding devices, the program instructions comprising program instructions for:
   enumerating devices connected to the subsystem to determine individual multiple devices that are connected to the subsystem;
   responsive to determining the individual multiple devices that are connected to the subsystem, determining maximum current consumption values for the individual multiple devices, wherein the maximum current consumption values indicate the maximum current that can be required by the corresponding individual multiple devices;
   programming current limit values that control the current supplied to corresponding ones of the multiple devices in conformity with the corresponding maximum current consumption values;
   adding the maximum current limit values to obtain an indication of a total maximum current or power required by the power distribution bus; and
   adjusting one or both of a power supply current overhead of the power distribution bus or a cooling overhead of the subsystem according to the indication of the total maximum current or power, such that a current supply capability of the power distribution bus meets or exceeds the total maximum current computed by the adding.

16. The computer program product of claim 15, wherein the program instructions for programming adjust current limit values of soft switches that couple corresponding ones of the multiple device connectors to the power distribution bus.

17. The computer program product of claim 15, wherein the program instructions for determining retrieve a device-specified maximum current consumption value obtained from each of the multiple devices during initialization of the devices.

18. The computer program product of claim 17, wherein the multiple device connectors are peripheral component interconnect (PCI) connectors and wherein the device-specified maximum current consumption value is a vital product data value.

19. The computer program product of claim 18, wherein the program instructions for programming adjusts current limit values of soft switches that couple corresponding ones of the multiple device connectors to the power distribution bus.

20. The computer program product of claim 15, wherein the program instructions for adjusting comprise program instructions for:
   determining whether or not the total maximum current or power is less than a threshold value;
   disabling a power supply connected to the power distribution bus in response to determining that the total maximum current or power is less than the threshold value; and
   enabling the power supply in response to determining that the total maximum current or power is not less than the threshold value.

21. The computer program product of claim 15, wherein the program instructions for adjusting comprise program instructions for:
   determining whether or not the total maximum current or power is less than a threshold value;
   disabling an air movement device of the subsystem in response to determining that the total maximum current or power is less than the threshold value; and
   enabling the air movement device in response to determining that the total maximum current or power is not less than the threshold value.

* * * * *